United States Patent
Bretl et al.

(10) Patent No.: US 6,681,226 B2
(45) Date of Patent: Jan. 20, 2004

(54) SELECTIVE PESSIMISTIC LOCKING FOR A CONCURRENTLY UPDATEABLE DATABASE

(75) Inventors: Robert F. Bretl, Portland, OR (US); Ramachandran Venkatesh, Hillsboro, OR (US)

(73) Assignee: Gemstone Systems, Inc., Beaverton, OR (US)

( * ) Notice: Subject to any disclaimer, the term of this patent is extended or adjusted under 35 U.S.C. 154(b) by 70 days.

(21) Appl. No.: 09/681,152

(22) Filed: Jan. 30, 2001

(65) Prior Publication Data

US 2002/0138483 A1 Sep. 26, 2002

(51) Int. Cl.[7] .............................................. G06F 17/30
(52) U.S. Cl. .......................................... 707/8; 707/200
(58) Field of Search ........................... 707/8, 3, 10, 200

(56) References Cited

U.S. PATENT DOCUMENTS

| | | | | |
|---|---|---|---|---|
| 5,280,612 A | * | 1/1994 | Lorie et al. ..................... | 707/8 |
| 5,764,977 A | * | 6/1998 | Oulid-Aissa et al. .......... | 707/10 |
| 5,835,757 A | * | 11/1998 | Oulid-Aissa et al. .......... | 707/10 |
| 5,920,857 A | * | 7/1999 | Rishe et al. .................... | 707/3 |
| 6,363,387 B1 | * | 3/2002 | Ponnekanti et al. ........... | 707/10 |
| 6,397,227 B1 | * | 5/2002 | Klein et al. .................... | 707/200 |

OTHER PUBLICATIONS

Almarode, Jay and Bretl, Robert, Reduced–Conflict Objects, JOOP —Journal of Object Oriented Programming, Jan., 1998, pp. 40–44.

* cited by examiner

*Primary Examiner*—Sanjiv Shah
(74) *Attorney, Agent, or Firm*—Ipsolon LLP

(57) ABSTRACT

Software and a method selectively apply a pessimistic concurrency control for each database update that conflicts with another database update. The method includes determining whether a database update conflicts with another database update, applying an optimistic concurrency control for each database update that does not conflict with another database update, and applying a pessimistic concurrency control for each database update that does conflict with another database update. This provides a selective locking concurrency control that selectively applies transaction serialization and locking only when transaction conflicts are detected. As a result, the selective locking concurrency control avoids livelock transaction failures and provides deterministic transaction completion without the computational expense of a conventional pessimistic concurrency control.

13 Claims, 4 Drawing Sheets

COMMITTING TRASNACTION QUEUE

CONCURRENT UPDATE COMMIT QUEUE

COMMITTING TRASNACTION QUEUE

CONCURRENT UPDATE COMMIT QUEUE

SELECTIVE PESSIMISTIC LOCKING FOR A CONCURRENTLY UPDATEABLE DATABASE

SUMMARY OF INVENTION

The present invention relates to concurrency control for updating databases and, in particular, to selective application of a pessimistic concurrency control when updating databases.

In database systems a transaction is a mechanism that allows multiple users to atomically perform in isolation database modifications that are guaranteed to be consistent and resilient when committed. With reference to database information in the form of software objects, for example, a write/write conflict occurs when an object modified in one transaction (e.g., by one user or process) is modified by another concurrent transaction (e.g., by another user or process). For example, when a transaction (e.g., by a first user) writes an object and executes complex behavior based upon the state of that object, the transaction cannot commit successfully if in the meantime another transaction (e.g., by a second user) has committed a modification of that object.

One way to prevent such concurrency conflicts is to incorporate into the database system a pessimistic concurrency control with which the database can be locked to prevent it from being accessed by more than one user or process at a time. With conventional pessimistic concurrency controls, every transaction locks the database objects being modified to prevent conflicts with other transactions. However, locking can be computationally expensive because it requires arbitration by a lock manager and deadlock detection. Locking objects also enforces an ordering of all transactions so that the database remains in a consistent state, but this comes at the cost of decreased availability of the locked objects. When a transaction locks an object, other transactions are restricted from accessing the object until the transaction releases its lock.

Another way to prevent concurrency conflicts is to incorporate into the database system an optimistic concurrency control that uses application code to avoid the conflicts in accessing a database. Logical conflict detection is used to detect conflicts and interrupt conflicting transactions, and a replay mechanism attempts to complete or commit the interrupted transaction within a predetermined number of replays or "redos." Failure to complete the interrupted transaction within the predetermined number of replays results in a transaction failure (retryFailure). However, optimistic concurrency controls are susceptible to livelock and process starvation wherein a transaction is prevented from committing because successive other transactions are committed first.

The present invention includes software and a method for concurrently updating a database. For example, the method includes determining whether a database update conflicts with another database update, applying an optimistic concurrency control for each database update that does not conflict with another database update, and applying a pessimistic concurrency control for each database update that does conflict with another database update. This invention provides a selective locking concurrency control that selectively applies transaction serialization and locking only when transaction conflicts are detected. As a result, the selective locking concurrency control avoids livelock transaction failures and provides deterministic transaction completion without the computational expense of a conventional pessimistic concurrency control.

Additional advantages of the present invention will be apparent from the detailed description of the preferred embodiment thereof, which proceeds with reference to the accompanying drawings.

DETAILED DESCRIPTION

Figure 1:
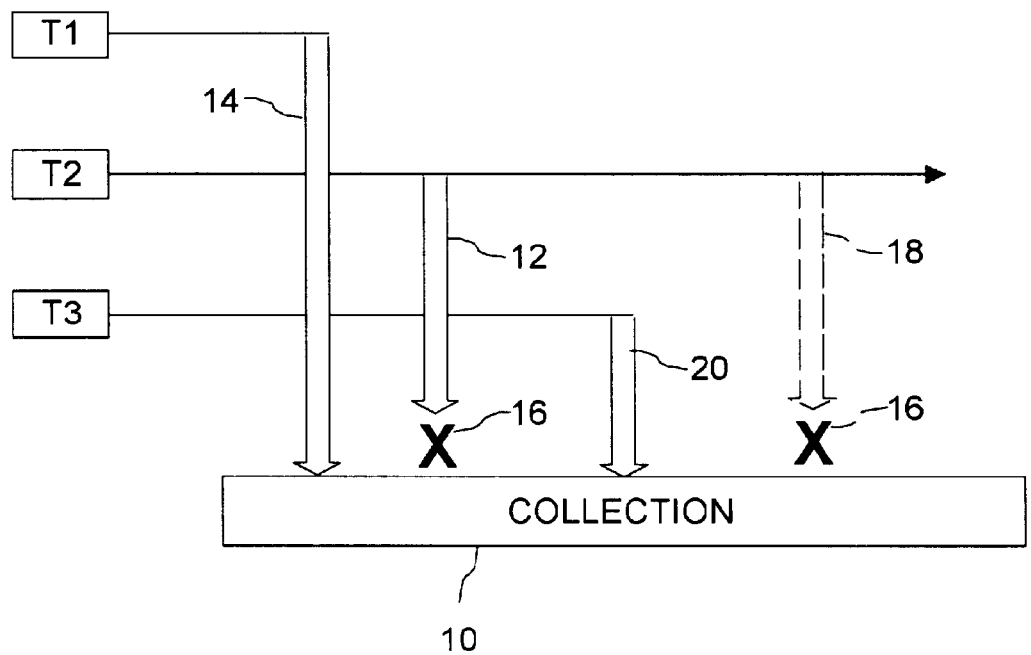
FIG. 1 is a timing diagram illustrating a concurrency conflict that can occur when different transactions are being committed to a common database object.

FIG. 1 is a timing diagram illustrating a concurrency conflict that can occur when different transactions, T1, T2, and T3, are being committed to a common database, which may be referred to as a concurrently updateable collection class or collection of information or data objects (referred to as collection 10). Collection 10 supports logical concurrency, which implements an automatic retry of a failed attempt to commit for which the operation should logically not cause a transaction conflict. Objects such as collection 10 may be referred to as a "concurrently updateable object" because the user doesn't have to manage the concurrency control to update it. In contrast, collection 10 commonly would only support physical concurrency in which case the user would have to manage the concurrency with locks or the optimistic transaction might fail with a write/write conflict.

Generally, transactions T1, T2, and T3 allow different users or processes to atomically perform in isolation database modifications that are guaranteed to be consistent and resilient when committed. However, events in some sequences can cause conflicts that cause attempts to commit the transactions to fail.

For example, a conflict between concurrent transactions T1 and T2, which started at approximately the same time, can occur if transaction T2 attempts to commit 12 after transaction T1 is committed 14. Such a write-write conflict results in a commit failure 16 for transaction T2. In response to such a commit failure 16, one or more predetermined number of other commit attempts 18 (only one shown) will typically be made for transaction T2. Under some circumstances, however, other concurrent transactions (e.g., transaction T3) can commit 20 before the renewed commit attempt 18 is made for transaction T2. These other concurrent transactions can create a "livelock" that prevents transaction T2 from being committed within the preset number of attempts.

One way to prevent concurrency conflicts is to incorporate into the database system a pessimistic concurrency control with which collection 1 0 can be locked to prevent it from being accessed by more than one user or process at a time. With a conventional pessimistic concurrency control, every transaction locks the objects being modified by the transaction to prevent conflicts with other transactions.

However, locking can be computationally expensive because it requires arbitration by a lock manager and deadlock detection. Deadlocks can arise when two or more processes attempt to acquire two or more locks. For example: Process P1 acquires lock L1, and Process P2 acquires lock L2. Then Process P1 attempts to acquire lock L2, but it is blocked because P2 already has it. Then P2 attempts to acquire lock L1, but cannot because P1 already has it. In this case both processes end up waiting for resources locked by the other and this results in a "deadly embrace" or deadlock. Locking objects also enforces an ordering of all transactions so that the database remains in a consistent state, but this comes at the cost of decreased availability of the locked objects. When a transaction locks an object, other transactions are restricted from accessing the object until the transaction releases its lock.

Another way to prevent concurrency conflicts is to incorporate into the database system an optimistic concurrency control that uses application code to avoid the conflicts in accessing collection 10. Logical conflict detection is used to detect conflicts and interrupt conflicting transactions, and a replay mechanism attempts to complete or commit the interrupted transaction within a predetermined number of replays or "redos." Failure to complete the interrupted transaction within the predetermined number of replays results in a transaction failure (retryFailure).

Optimistic concurrency controls are susceptible to livelock and process starvation wherein a transaction (e.g., T2) is prevented from committing because successive other transactions are committed first. Accordingly, although it avoids the computational expense of pessimistic concurrency control, optimistic concurrency control can result in non-deterministic application behavior that also can significantly affect throughput.

Figure 2:
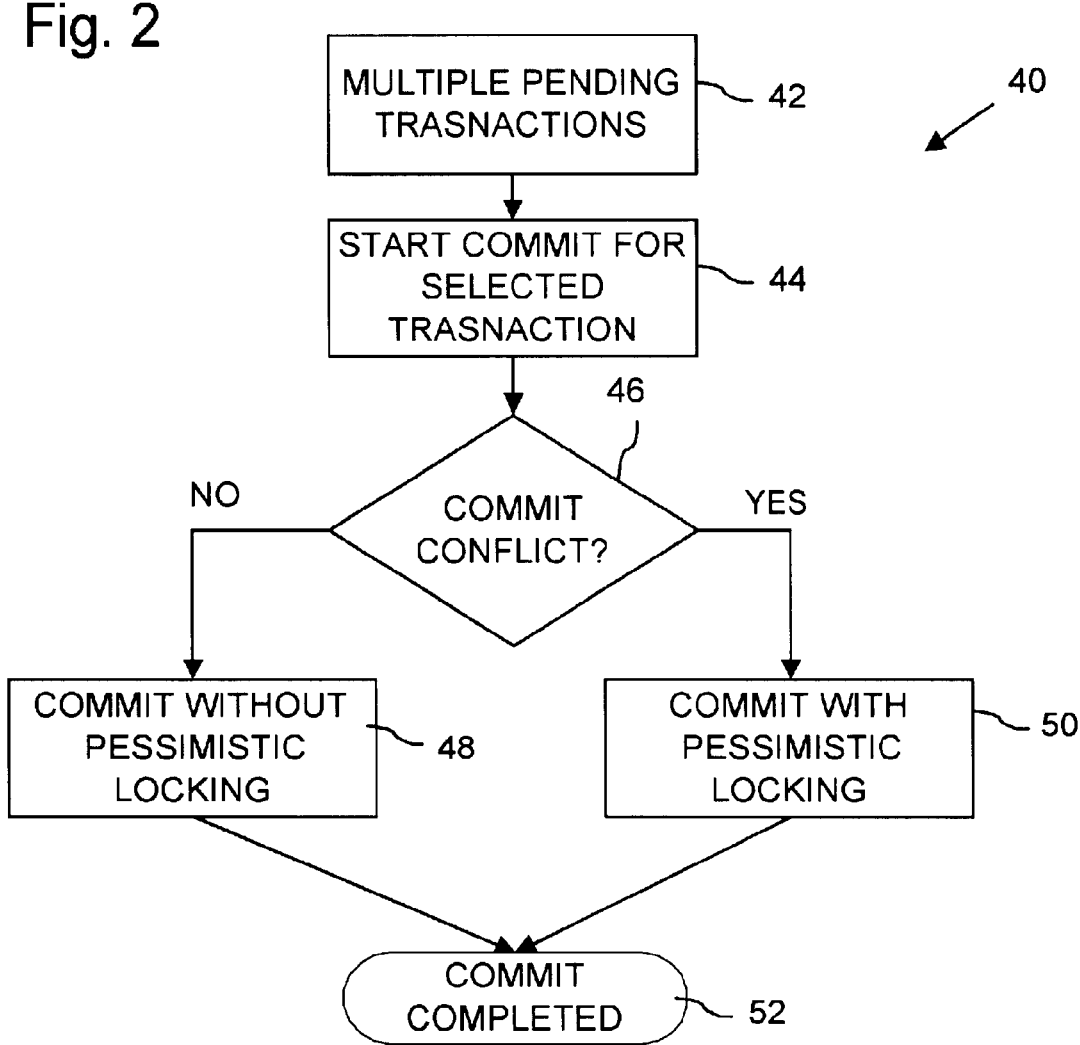
FIG. 2 is a flow diagram of a selective locking concurrency control method according to the present invention.

FIG. 2 is a flow diagram of a selective locking concurrency control method 40 that selectively applies transaction serialization and locking only when transaction conflicts are detected. As a result, selective locking concurrency control method 40 avoids livelock transaction failures and provides deterministic transaction completion without the computational expense of a conventional pessimistic concurrency control.

Process block 42 indicates that multiple transactions are separately underway to modify a database of disjoint fields, such as the concurrently updateable collection of information or data objects referred to as collection 10.

Process block 44 indicates that a commit is initiated for a selected transaction to modify the database.

Inquiry block 46 represents an inquiry as to whether a commit conflict is detected for the selected transaction. The commit conflict may be detected as a concurrent modification of the database by more than one transaction operating on the same data or object, typically as a write/write conflict at the physical level. If no commit conflict is detected, inquiry block proceeds to process block 48. If a commit conflict is detected, inquiry block proceeds to process block 50.

Process block 48 indicates that the commit for the selected transaction is performed without pessimistic locking of the database. Such a commit operation may be performed with a minimum of computational resources and is analogous to an optimistic concurrency control.

Process block 50 indicates that the commit for the selected database is performed with pessimistic locking of the database. The operation of process block 50 functions as a transaction "redo," which is a logical sequence of operations that are performed to successfully resolve a transaction failure.

Process block 52 indicates that the commit is completed for the selected transaction.

Selective locking concurrency control method 40 combines the advantageous performance features of both optimistic concurrency controls and pessimistic concurrency controls. In the absence of a commit conflict, concurrency control method 40 operates substantially as an optimistic concurrency control (e.g., process block 48). Upon detection of a commit conflict (e.g., concurrent database modification), concurrency control method 40 operates substantially as a pessimistic concurrency control (e.g., process block 50).

With this selective application of pessimistic locking, the transaction redo of process block 50 is protected from the livelocking that is characteristic of conventional optimistic concurrency controls. As a result, concurrency control method 40 optimizes concurrency control performance by utilizing optimistic or pessimistic concurrency controls according to the circumstances.

Figure 3:
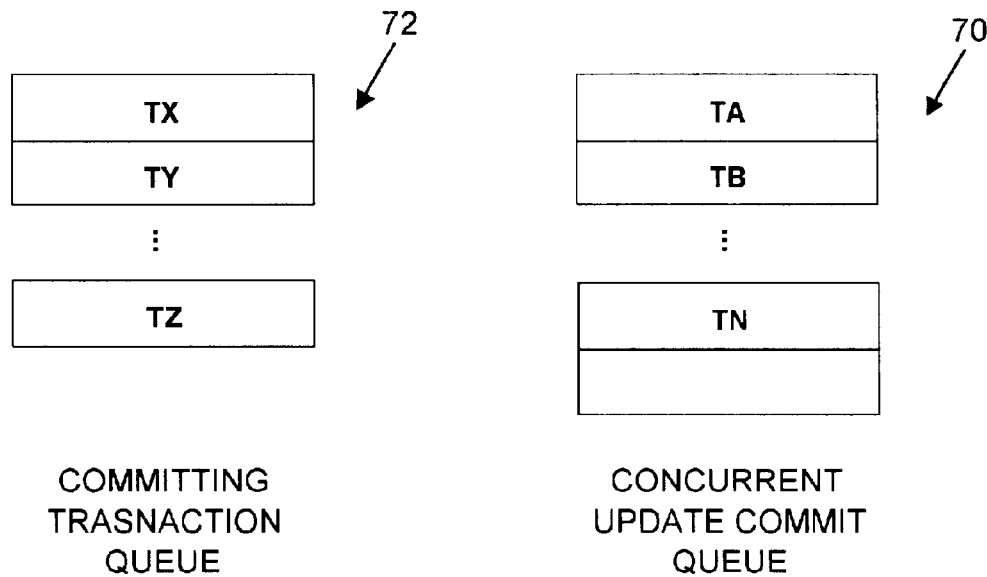
FIG. 3 is a schematic block diagram illustrating an initial condition in the operation of a concurrent update commit queue for providing selective application of pessimistic locking in accordance with the present invention.

FIG. 3 is a schematic block diagram illustrating an initial condition in the operation of a concurrent update commit queue 70 from which transactions are committed by selective application of pessimistic locking in accordance with the present invention. Concurrent update commit queue 70 functions to serialize commits for transactions for which a commit conflict has been identified. As is known in the art, a queue is a linear list for which all insertions are made at one end of the list and all deletions are made at the other. Queues are sometimes referred to as first-in-first-out (FIFO) lists.

Concurrent update commit queue 70 operates in conjunction with a committing transaction queue 72 of a type conventionally used to implement an optimistic concurrency control. Committing transaction queue 72 sequentially organizes or serializes multiple transactions TX, TY, . . . , TZ to be committed to a database, such as concurrently updateable collection class or collection 10. Committal is commenced or attempted for each transaction (e.g., TX) when it reaches the top of queue 72. In this illustration, the "top" of queue 72 merely refers to a current transaction in the series of transactions. In the absence of a commit conflict, committal of the current transaction (e.g., TX) is completed and the top of queue is cleared of the transaction. This operation of committing transaction queue 72 corresponds an optimistic concurrency control portion of control method 40.

If a commit conflict is detected when committal is commenced or attempted for a transaction (e.g., TX), the committal initially fails and the transaction is shifted to the bottom of concurrent update commit queue 70. In this illustration, the "bottom" of queue 70 merely refers to a least-current transaction in the series of transactions. Concurrent update commit queue 70 sequentially organizes or serializes multiple transactions TA, TB, . . . , TN, TX for which an initial attempt to commit to collection 10 failed for a commit conflict.

Figure 4:
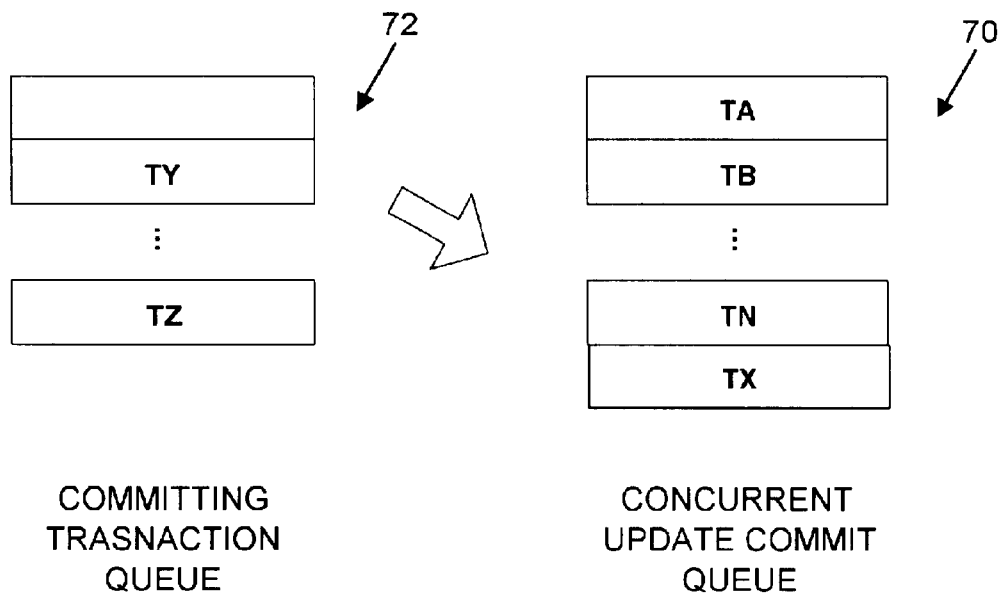
FIG. 4 is a schematic block diagram illustrating a subsequent initial condition in the operation of the concurrent update commit queue.
Figure 5:
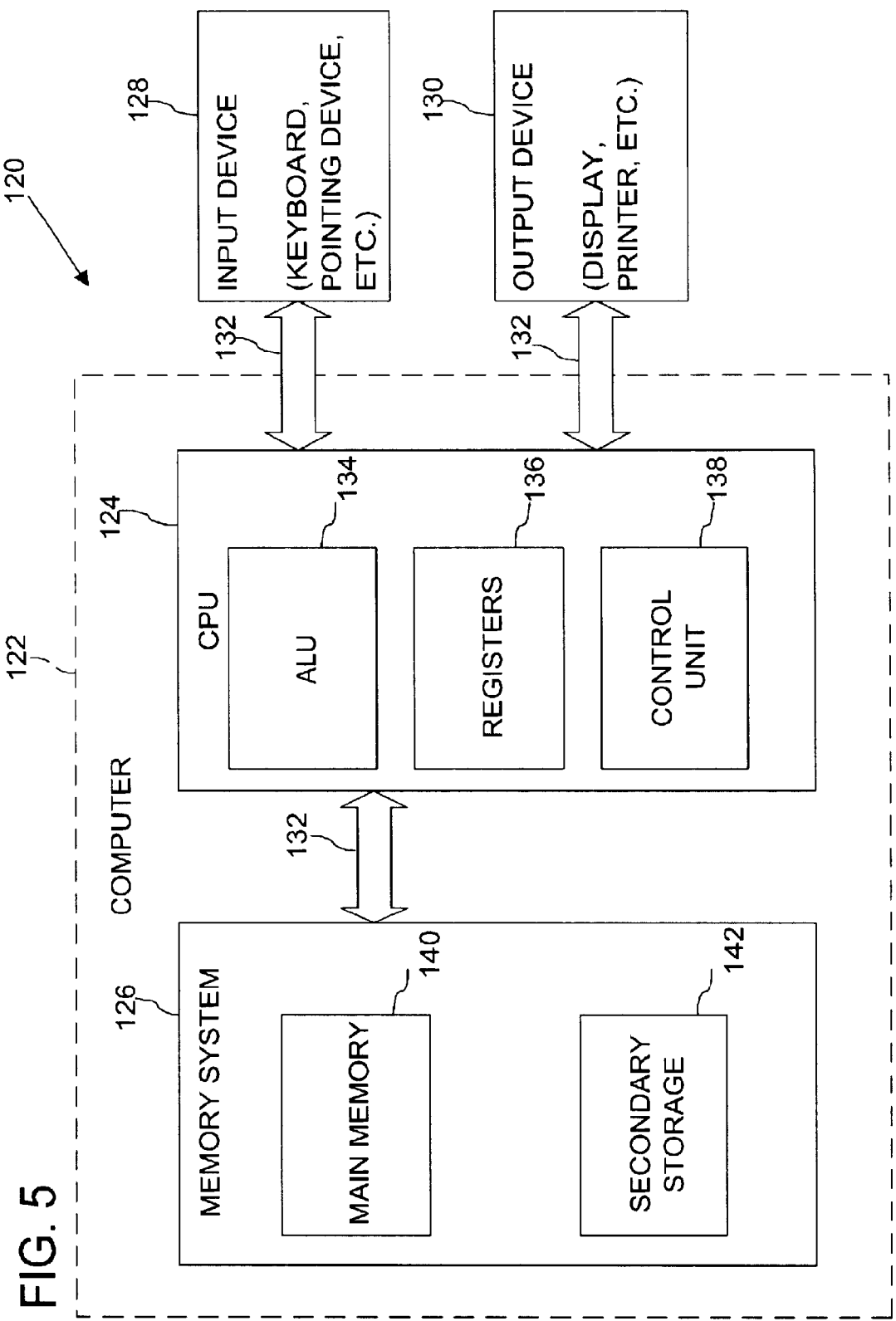
FIG. 5 is a block diagram of a computer system that may be used to implement the present invention.

In accordance with the present invention, a redo or replay committal is commenced for each transaction (e.g., TA) when it reaches the top of queue 70, as shown in FIG. 4. In contrast to transactions in queue 72, the redo or replay committal of each transaction reaching the top of queue 70 includes application of a pessimistic lock to prevent other transactions from being concurrently committed to collection 10. As a result, no redo or replay committal of a transaction reaching the top of queue 70 can fail due to a commit conflict. This implementation of committing transaction queue 72 corresponds a pessimistic concurrency control portion of control method 40.

It will be appreciated that a queue manager (not shown) may optionally be provided to manage prioritization between committal of transactions in queues 70 and 72. The queue manager may allocate committals between queues 70 and 72 in any manner. The queue manager will allow only one transaction at a time, independent of which queue it came from, to be in the critical region, i.e., actively committing at any given time.

This selective application of a pessimistic lock allows each redo to be completed in a finite number of attempts (e.g., one) while minimizing the significant computational expense of universally applying pessimistic locks. Moreover, transactions undergoing redo will no longer be starved or live-locked as can occur with conventional optimistic concurrency controls. As a result, the present invention generalizes readily to 2-phase commits since it guarantees that concurrently updateable collections will not cause the second phase of the transaction to fail and will not affect the throughput for transactions that do not involve concurrently updateable objects.

As another illustration of the present invention, a pseudo-code listing representing selected aspects of the invention is set forth below. In this illustration, the term "CuWriteSet" refers to a set of modified concurrently updateable objects that are managed explicitly by updateable collection classes. The pseudo-code listing illustrates operations occurring during a commit or commit attempt for one transaction.

The term "validation failure" indicates that a conflict was detected for the initial commit attempt. The term "BreakSerialization( )" indicates the commit token (i.e., top of queue status) is passed to a next transaction in the commit queue, but the lock is maintained and the transaction keeps its positionin the in the concurrent update queue (e.g., concurrent update commit queue 70) so that other transactions that attempt to lock the same object will be processed after it. The phrase "success=dojavaRedo( )" indicates that the lock-protected transaction is replayed. The term "BreakSerializationReleaseLocks (cuwriteSet)" indicates success of the commit from the concurrent update queue and that the transaction is removed from the concurrent update queue and the locks are released.

FIG. 4 illustrates an operating environment for an embodiment of the present invention as a computer system 120 with a computer 122 that comprises at least one high speed processing unit (CPU) 124 in conjunction with a memory system 126, an input device 128, and an output device 130. These elements are interconnected by at least one bus structure 132.

The illustrated CPU 124 is of familiar design and includes an ALU 134 for performing computations, a collection of registers 136 for temporary storage of data and instructions, and a control unit 138 for controlling operation of the system 120. The CPU 124 may be a processor having any of a variety of architectures including Alpha from Digital, MIPS from MIPS Technology, NEC, IDT, Siemens, and others, x86 from Intel and others, including Cyrix, AMD, and Nexgen, the PowerPC from IBM and Motorola, and the Sparc architecture from Sun Microsystems.

```
Pseudo-code:
    // on the session's side the commit sequence is
commit() {
            boolean success = SerializationGetLocks(cuWriteSet);
            // have the commit token, try to do the validation
            success = dovalidation(),
            if (success) {
              successfulCommit (cuwriteSet);
              return true; // everything worked
              }
            else { // validation failure
              stnCallBreakSerialization(); // kep locks on return
              success = dojavaRedo();
              if (!success) {
                stnCallBreakSerializationReleaseLocks (cuwriteSet);
                return false; // cu failure
              }
              return commit();
              }
    }
    stnCallSerializationGetLocks(cuWriteSet) {
      getLocks (cuwriteset); // blocks until locks are acquired
      getcommitToken ();
      return true;
    }
    stnCallSuccessfulCommit (cuwriteSet) {
      giveupLocks (cuwriteSet);
      notifywaiter();
      return,
    BreakSerializationReleaseLocks (cuwriteSet) {
      giveupCommitToken (),
      giveupLocks (cuwriteset);
      notifywaiter();
      return;
    }
    BreakSerialization(cuwriteSet) {
      giveupC ommitToken ();
    }
    assumed primitives:
      getcommitToken(), giveupCommitToken(),
```

The memory system 126 generally includes highmain memory 140 in the form of a medium such as random access memory (RAM) and read only memory (ROM) semiconductor devices, and secondary storage 142 in the form of long term storage mediums such as floppy disks, hard disks, tape, CDflash memory, etc. and other devices that store data using electrical, magnetic, optical or other recording media. The main memory 140 also can include video display memory for displaying images through a display device. Those skilled in the art will recognize that the memory 126 can comprise a variety of alternative components having a variety of storage capacities.

The input and output devices 128 and 130 also are familiar. The input device 128 can comprise a keyboard, a mouse, a physical transducer (e.g., a microphone), etc. The output device 130 can comprise a display, a printer, a transducer (e.g., a speaker), etc. Some devices, such as a network interface or a modem, can be used as input and/or output devices.

As is familiar to those skilled in the art, the computer system 120 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 126.

In accordance with the practices of persons skilled in the art of computer programming, the present invention is described below with reference to acts and symbolic representations of operations that are performed by computer system 120, unless indicated otherwise. Such acts and operations are sometimes referred to as being computer-executed and may be associated with the operating system or the application program as appropriate. It will be appreciated that the acts and symbolically represented operations include the manipulation by the CPU 124 of electrical signals representing data bits which causes a resulting transformation or reduction of the electrical signal representation, and the maintenance of data bits at memory locations in memory system 126 to thereby reconfigure or otherwise alter the computer system's operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A concurrent transaction updating method for concurrently updating a database, comprising:
   determining whether a database update conflicts with another database update;
   applying an optimistic concurrency control for each database update that does not conflict with another database update; and
   applying a pessimistic concurrency control for each database update that does conflict with another database update, the pessimistic concurrency control being applied in a replay of each database update that conflicts with another database update.

2. The method of claim 1 in which each database update that conflicts with another database update undergoes only one replay.

3. The method of claim 1 in which the pessimistic concurrency control applies a lock to the database during the database update that conflicts with another database update.

4. A concurrent transaction updating method for concurrently updating a database, comprising:
   determining whether a database update conflicts with another database update;
   applying an optimistic concurrency control for each database update that does not conflict with another database update, the database updates for which the optimistic concurrency control is applied occurring sequentially from a committing transaction queue; and
   applying a pessimistic concurrency control for each database update that does conflict with another database update, the database updates for which a pessimistic concurrency control are applied occurring sequentially from a concurrent update commit queue.

5. The method of claim 4 in which each database update is first initiated from the committing transaction queue and each database update that conflicts with another database update is copied from the committing transaction queue to the concurrent update commit queue.

6. In a computer readable medium, concurrent updating software for concurrently updating a database, comprising:
   software for determining whether a database update conflicts with another database update;
   software for applying an optimistic concurrency control for each database update that does not conflict with another database update; and
   software for applying a pessimistic concurrency control for each database update that does conflict with another database update, the pessimistic concurrency control being applied in a replay of each database update that conflicts with another database update.

7. The medium of claim 6 in which each database update that conflicts with another database update undergoes only one replay.

8. The medium of claim 6 in which software for applying the pessimistic concurrency control applies a lock to the database during the database update that conflicts with another database update.

9. In a computer readable medium, concurrent updating software for concurrently updating a database, comprising:
   software for determining whether a database update conflicts with another database update;
   software for applying an optimistic concurrency control for each database update that does not conflict with another database update, the database updates for which an optimistic concurrency control is applied occurring sequentially from a committing transaction queue; and software for applying a pessimistic concurrency control for each database update that does conflict with another database update, the database updates for which a pessimistic concurrency control are applied occurring sequentially from a concurrent update commit queue.

10. The medium of claim 9 in which each database update is first initiated from the committing transaction queue and each database update that conflicts with another database update is copied from the committing transaction queue to the concurrent update commit queue.

11. In a computer readable medium having software for updating a database, including software for determining whether a database update conflicts with another database update, the improvement comprising:

software for selectively applying a pessimistic concurrency control for each database update that conflicts with another database update, the pessimistic concurrency control being applied in a replay of each database update that conflicts with another database update.

12. The medium of claim 11 in which each database update that conflicts with another database update undergoes only one replay.

13. The medium of claim 11 in which software for selectively applying the pessimistic concurrency control applies a look to the database during the database update that conflicts with another database update.

* * * * *